(12) United States Patent
Mizuno et al.

(10) Patent No.: US 8,097,997 B2
(45) Date of Patent: Jan. 17, 2012

(54) DRIVING DEVICE WITH ROTATING ELECTRIC MACHINE

(75) Inventors: Yota Mizuno, Toyota (JP); Yuji Shimada, Nissin (JP); Hiroshi Hata, Nagoya (JP); Akito Okawa, Toyota (JP); Kinji Tange, Nishikamo-gun (JP); Kinya Yoshii, Toyota (JP); Masatoshi Adachi, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 640 days.

(21) Appl. No.: 11/794,270

(22) PCT Filed: Feb. 24, 2005

(86) PCT No.: PCT/JP2005/003563
§ 371 (c)(1),
(2), (4) Date: Jun. 27, 2007

(87) PCT Pub. No.: WO2006/090484
PCT Pub. Date: Aug. 31, 2006

(65) Prior Publication Data
US 2008/0106163 A1    May 8, 2008

(51) Int. Cl.
*H02K 7/116* (2006.01)
(52) U.S. Cl. .... 310/216.131; 310/216.128; 310/216.135
(58) Field of Classification Search .......... 310/216.131, 310/216.133, 216.128, 216.132, 216.134, 310/216.135, 217; 475/150, 5; 477/5
See application file for complete search history.

(56) References Cited

U.S. PATENT DOCUMENTS

| | | | | |
|---|---|---|---|---|
| 2,025,817 | A * | 12/1935 | Lanz | 310/172 |
| 2,406,045 | A * | 8/1946 | Stevens | 336/73 |
| 3,693,035 | A * | 9/1972 | Ostwald | 310/51 |
| 5,111,090 | A | 5/1992 | Otake et al. | |
| 5,396,968 | A * | 3/1995 | Hasebe et al. | 180/65.6 |
| 6,311,495 | B1 | 11/2001 | Shimizu et al. | |
| 6,969,333 | B2 * | 11/2005 | Sayama | 475/5 |
| 2002/0019284 | A1 * | 2/2002 | Aikawa et al. | 475/150 |
| 2004/0045752 | A1 * | 3/2004 | Omote et al. | 180/65.2 |
| 2005/0037883 | A1 * | 2/2005 | Motoike et al. | 475/5 |

FOREIGN PATENT DOCUMENTS

| | | |
|---|---|---|
| CN | 1473119 A | 2/2004 |
| DE | 600 05 285 T2 | 7/2004 |
| DE | 602 26 272 T2 | 5/2009 |
| FR | 2596929 * | 10/1987 |

(Continued)

OTHER PUBLICATIONS

EPO website machine translation of FR 2596929, Oct. 1987, France, Rich, All pages.*

(Continued)

*Primary Examiner* — Quyen Leung
*Assistant Examiner* — Naishadh Desai
(74) *Attorney, Agent, or Firm* — Oliff & Berridge, PLC (57) ABSTRACT

A transaxle includes a case having an opening, a second rotating electric machine stored in the opening of the case and having a stator, a rear planetary gear stored in the transaxle case and connected to the second rotating electric machine, a transaxle rear cover sealing the opening and a bolt fixing the second rotating electric machine to the transaxle case. The stator has first and second thrust end faces defining an axial length thereof. The first thrust end face is pressed against an inner surface of the case.

12 Claims, 5 Drawing Sheets

FOREIGN PATENT DOCUMENTS

| | | |
|---|---|---|
| JP | A 59-209053 | 11/1984 |
| JP | A 03-150050 | 6/1991 |
| JP | A 04-364339 | 12/1992 |
| JP | A 06-225485 | 8/1994 |
| JP | A 10-234146 | 9/1998 |
| JP | A 11-243658 | 8/1999 |
| JP | A 2000-318473 | 11/2000 |
| JP | A 2001-057760 | 2/2001 |
| JP | A 2001-069717 | 3/2001 |
| JP | A 2001-071767 | 3/2001 |
| JP | A 2001-224151 | 8/2001 |
| JP | A 2002-171717 | 6/2002 |
| JP | A 2003-191759 | 7/2003 |
| JP | A 2004-248373 | 9/2004 |
| JP | A 2004-254434 | 9/2004 |
| WO | WO 03/055709 A1 | 7/2003 |

OTHER PUBLICATIONS

Nov. 24, 2010 Office Action issued in German Patent Application No. 11 2005 003 440.2-26 (with English Translation).

Oct. 19, 2010 Japanese Office Action issued in Japanese Application No. 2007-504614 (with translation).

* cited by examiner

DRIVING DEVICE WITH ROTATING ELECTRIC MACHINE

TECHNICAL FIELD

The present invention relates to a driving device with a rotating electric machine, and more particularly, to a driving device with a rotating electric machine mounted on a vehicle.

BACKGROUND ART

A driving device with a rotating electric machine mounted on a vehicle has been disclosed, for example, in Japanese Patent Laying-Open No. 2004-254434 (Document 1). Japanese Patent Laying-Open Nos. 2003-191759 (Document 2), 59-209053 (Document 3), 2001-69717 (Document 4) and 2002-171717 (Document 5) disclose a rotating electric machine.

DISCLOSURE OF THE INVENTION

In a conventional driving device with a rotating electric machine, there has been a problem that vibration caused by meshing of gears constituting the driving device and transmitted through a case and vibration transmitted through a rotor shaft of the rotating electric machine make resonance, producing gear noise.

The present invention has been made to solve the problem as mentioned above. An object of the present invention is to provide a driving device with a rotating electric machine that can reduce occurrence of noise.

A driving device with a rotating electric machine according to the present invention includes a case having an opening, a rotating electric machine stored in the opening of the case and having a stator, a gear wheel stored in the case and connected to the rotating electric machine, a cover sealing the opening and a fastener fixing the rotating electric machine to the case. The stator has first and second thrust end faces defining an axial length thereof and the first thrust end face is pressed against an inner surface of the case.

In a driving device with a rotating electric machine thus configured, since the first thrust end face of the stator is pressed against the inner surface of the case, the case and the stator are united with each other to increase the apparent mass of the case. Thereby, vibration of the case itself can be prevented and occurrence of noise can be reduced.

Preferably, the stator has a stator core and the stator core is in contact with the inner surface of the case.

Preferably, an end of the stator core and the inner surface of the case are in contact with each other.

Preferably, the stator and the inner surface of the case are in contact with each other at a lower side of the stator in a vertical direction.

Preferably, the driving device with a rotating electric machine further includes a pressing member for pressing the stator core in a radial direction (in the direction of the radius of the stator) to bring an outer periphery surface of the stator core into contact with the inner surface of the case. The pressing member is fixed to the stator core by the fastener.

Preferably, at a side of the case in contact with the cover, the stator core and the inner surface of the case are in contact with each other.

Preferably, the stator has a coil, and the coil and the cover are in contact with each other.

BEST MODES FOR CARRYING OUT THE INVENTION

Hereinafter, embodiments of the present invention will be described with reference to the drawings. In the embodiments, the same or corresponding elements are designated by the same reference characters and description thereof will not be repeated.

First Embodiment

Figure 1:
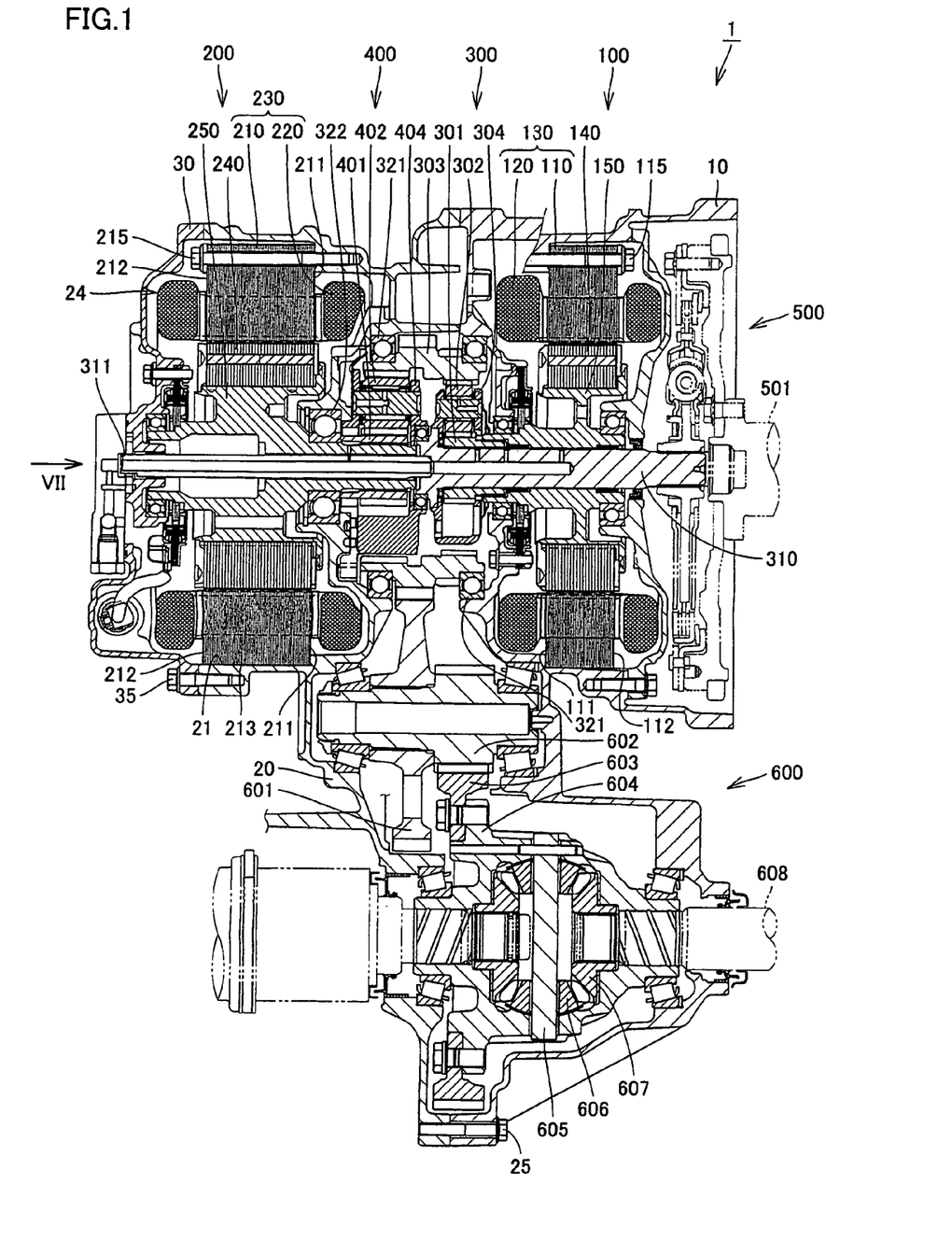
FIG. 1 is a cross-sectional view of a transaxle according to a first embodiment of the present invention.

FIG. 1 is a cross-sectional view of a transaxle according to a first embodiment of the present invention. Referring to FIG. 1, a transaxle 1 according to the first embodiment of the present invention includes a transaxle housing 10, a transaxle case 20 connected to transaxle housing 10, and a transaxle rear cover 30 sealing an end of transaxle case 20. A transaxle damper 500, a first rotating electric machine 100, a second rotating electric machine 200, a front planetary gear 300, a rear planetary gear 400 and a powertrain 600 are stored in a space surrounded by transaxle housing 10, transaxle case 20 and transaxle rear cover 30.

Second rotating electric machine 200 as a motor for driving and first rotating electric machine 100 as a generator to generate electric power are contained in transaxle 1.

Transaxle damper 500 is a mechanism that transmits driving force from a shaft 501 connected to the engine and is composed of a coil spring damper. In addition, with a torque variation absorbing mechanism having a friction material of a dry type single plate, transaxle damper 500 serves to absorb torque variation in driving force from the engine.

First rotating electric machine 100 is provided at an outer periphery of transaxle damper 500 and has a rotor shaft 150 as a rotating element, a rotor 140 provided at an outer periphery of rotor shaft 150 and a stator 130 to rotate rotor 140. In the embodiment, first rotating electric machine 100 functions as a generator, however, the present invention is not limited thereto and first rotating electric machine 100 may function as a motor. In addition, switching may be performed such that first rotating electric machine 100 works as either a motor or a generator as needed.

Rotor shaft 150 is located at an outer periphery of a main shaft 310 and can be rotated separately and independently from main shaft 310. Rotor shaft 150 is supported in transaxle housing 10 with a bearing.

Rotor 140 is fixed to the outer periphery of rotor shaft 150. Rotor 140 has a structure in which electromagnetic steel plates are laid on each other and a permanent magnet extending in the thrust direction is embedded within the steel plates. First electric rotating machine 100 is the so-called three-phase motor and rotates rotor 140 by exerting electromagnetic force on rotor 140.

Stator 130 is fixed to transaxle housing 10 by a bolt 115 in the state where the stator is opposite to rotor 140. Stator 130 has a stator core 110 composed of electromagnetic steel plates laid on each other and a coil 120 wound around stator core 110. For a method of winding coil 120, either a distributed winding method or a concentrated winding method may be employed. A first thrust end face 111 as one end face of annular stator core 110 is in contact with transaxle housing 10 while a second thrust end face 112 as the other end face is separated form transaxle housing 10.

Front planetary gear 300 is provided around main shaft 310 in the state where the front planetary gear is adjacent to first rotating electric machine 100. Front planetary gear 300 has a sun gear 301, a pinion gear 302 meshing sun gear 301, a ring gear 303 meshing pinion gear 302 and a planetary carrier 304 holding pinion gear 302. Sun gear 301 is connected to rotor shaft 150 to rotate with rotor shaft 150. Planetary carrier 304 rotates with main shaft 310. Ring gear 303 is held in transaxle housing 10 with a counter drive bearing 321.

Another shaft 311 is disposed to be connected to main shaft 310. Around shaft 311, second rotating electric machine 200 is located. In the embodiment, second rotating electric machine 200 is a motor, however, second rotating electric machine 200 is not limited to a motor and may be driven as a generator. In addition, switching may be performed such that second rotating electric machine 200 works as either a motor or a generator as needed.

Rotor shaft 250 is held in transaxle case 20 via rotor shaft bearing 322 and united with a rotor 240. Rotor 240 is composed of electromagnetic steel plates laid on each other with a permanent magnet embedded therewithin.

A stator 230 is disposed within transaxle case 20 in the state where the stator is opposite to the outer periphery of rotor 240. Stator 230 has a stator core 210 composed of electromagnetic steel plates laid on each other and a coil 220 wound around stator core 210. Stator core 210 has first and second thrust end faces 21l and 212 defining the axial length thereof. First thrust end face 211 is an end face proximal to the engine and second thrust end face 212 is an end face distal to the engine.

An outer periphery surface 213 as a radial surface is between first thrust end face 211 and second thrust end face 212 and is cylindrical in shape. First thrust end face 211 is in direct contact with transaxle case 20. In contrast, second thrust end face 212 is not in direct contact with an inner surface 21 of transaxle case 20. A hole is provided through stator core 210 and a bolt 215 is inserted into the hole. Bolt 215 is screwed into a wall surface of transaxle case 20 to press stator core 210 in the axial direction. Thereby, first thrust end face 211 of stator core 210 is pressed against transaxle case 20. A plurality of bolts 215 are disposed on the circumference. At a lower side of stator core 210, outer periphery surface 213 is in contact with inner surface 21 of transaxle case 20. The contact may be a line contact or a surface contact. Further, a member for attenuating vibration may be provided to engage a contact region. In this case, a vibration attenuation member is interposed between inner surface 21 and outer periphery surface 213.

A rear planetary gear 400 is disposed adjacent to second rotating electric machine 200. Rear planetary gear 400 has a sun gear 401 connected to rotor shaft 250, a pinion gear 402 meshing sun gear 401, a ring gear 303 meshing pinion gear 402, and planetary carrier 404 holding pinion gear 402. Ring gear 303 is shared between front planetary gear 300 and rear planetary gear 400 and power is transmitted between front planetary gear 300 and rear planetary gear 400 via ring gear 303.

A powertrain 600 has a driven gear 601 meshing outer periphery gear teeth of ring gear 303, a pinion gear 602 connected to driven gear 601, a ring gear 603 meshing pinion gear 602, a differential case 604 held by ring gear 603 to rotate with ring gear 603, a pinion shaft 605 stored in differential case 604, a pinion gear 606 rotatably held by pinion shaft 605 and being able to revolve, a side gear 607 meshing pinion gear 606 and a drive shaft 608 connected to side gear 607. Transaxle case 20 has an opening 24 as an inner space and transaxle rear cover 30 seals the opening. Transaxle rear cover 30 is a lid element and positioned opposite to an end face of shaft 311. Transaxle rear cover 30 is connected to transaxle case 20 by a bolt 35 to be an end face of transaxle 1. The transaxle housing 10 side of transaxle 1 is connected to the engine and the transaxle rear cover 30 side is located distal to the engine. Accordingly, when transaxle 1 is seen as a whole, transaxle housing 10 is a fixed end of vibration and transaxle rear cover 30 side is a free end of vibration.

In other words, transaxle 1 as a driving device with a rotating electric machine according to the present invention includes transaxle case 20 having opening 24, second rotating electric machine 200 stored in opening 24 of transaxle case 20, sun gear 401 as a gear wheel stored in transaxle case 20 and connected to second rotating electric machine 200, a pinion gear 402 and a ring gear 303, transaxle rear cover 30 sealing opening 24 and bolt 215 as a fastener fixing second rotating electric machine 200 to transaxle case 20. Stator 230 has first and second end faces 211 and 212 defining an axial length thereof. First thrust end face 211 is pressed against inner surface 21 of transaxle case 20.

Stator 230 has stator core 210 and stator core 210 is in contact with inner surface 21 of transaxle case 20. An end of stator core 210 is in contact with inner surface 21 of transaxle case 20.

Figure 2:
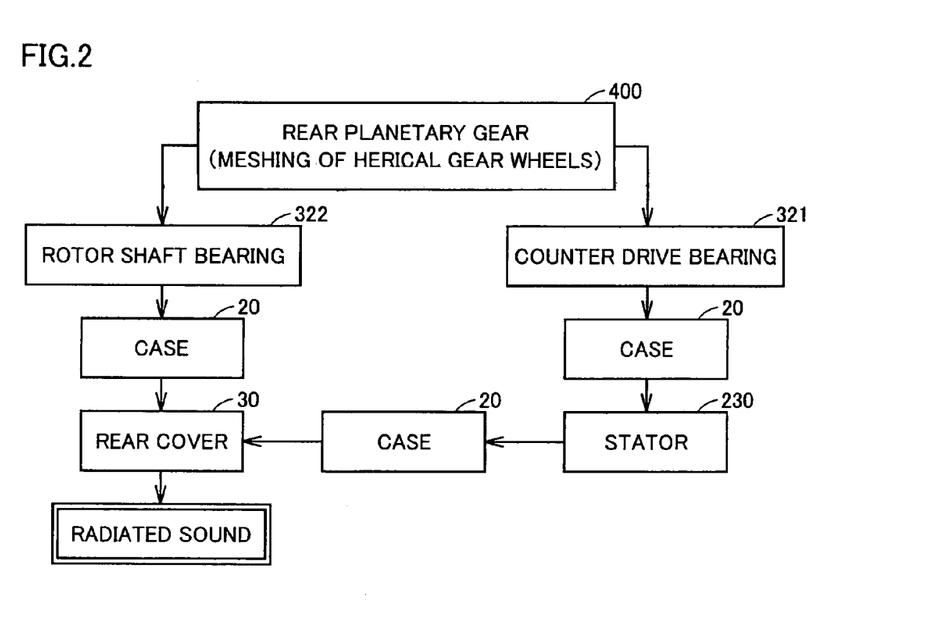
FIG. 2 is a block diagram of a vibration transmission path.

FIG. 2 is a block diagram of a transmission path of vibration in a transaxle. Referring to FIG. 2, in transaxle 1, vibration occurs in rear planetary gear 400. The vibration is caused by sun gear 401 as a helical gear constituting rear planetary gear 400, pinion gear 402 and ring gear 303. Part of the vibration is transmitted to transaxle rear cover 30 via rotor shaft bearing 322 and transaxle case 20. In addition, the vibration caused in rear planetary gear 400 passes through counter drive bearing 321, transaxle case 20 and stator 230 to return to transaxle case 20 and transaxle case 20 produces resonance of transaxle rear cover 30. The resonance causes radiated sound. According to the present invention, in such a vibration transmission path, transaxle case 20 and stator 230 are fixed to each other to increase the apparent mass thereof. As a result, vibration through transaxle case 20 and stator 230 is attenuated. In addition, when a lower part of stator 230 and transaxle case 20 are brought into contact with each other, sound is further attenuated since the lower part of stator 230 is the inverse phase. As shown in FIG. 1, since inner surface 21 and stator core 210 are in contact with each other on outer periphery surface 231 of stator 230 at the transaxle rear cover case 30 side, vibration can be attenuated more effectively.

Second Embodiment

Figure 3:
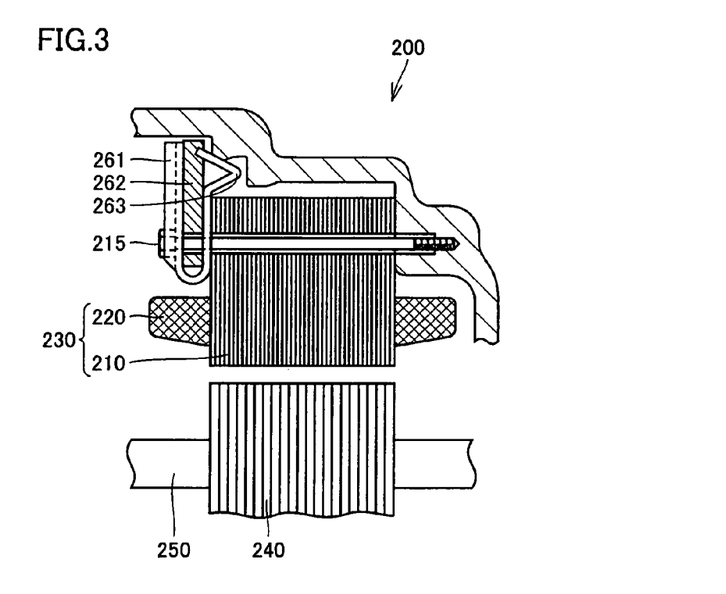
FIG. 3 is a cross-sectional view of a transaxle according to a second embodiment of the present invention.

FIG. 3 is a cross-sectional view of a transaxle according to a second embodiment of the present invention. Referring to FIG. 3, in transaxle 1 according to the second embodiment of the present invention, stator 230 is fixed to transaxle case 20 by a fastener 261. Stator 230 is cantilevered in clearance fit and fixed to transaxle case 20 by bolt 215. Stator 230 is positioned with fastener 261 interposed between a bearing surface of bolt 215 and stator core 210. Fastener 261 has a leading end 263 in the form of a wedge and composed of spring steel. Leading end 263 engages between transaxle case 20 and stator core 210 to be elastically deformed. Leading end 263 may be plastically deformed. Between stator core 210 and transaxle case 20 there is provided a clearance into which a wedge of spring steel is inserted. In the present embodiment, fastener 261 is composed of spring steel, however, the present invention is not limited thereto and fastener 261 may be composed of plastic, for example. Fastener 261 has a hardened member 262 therewithin. Since leading end 263 engages between transaxle case 20 and stator core 210, leading end 263 presses stator core 210 in the radial direction.

Figure 4:
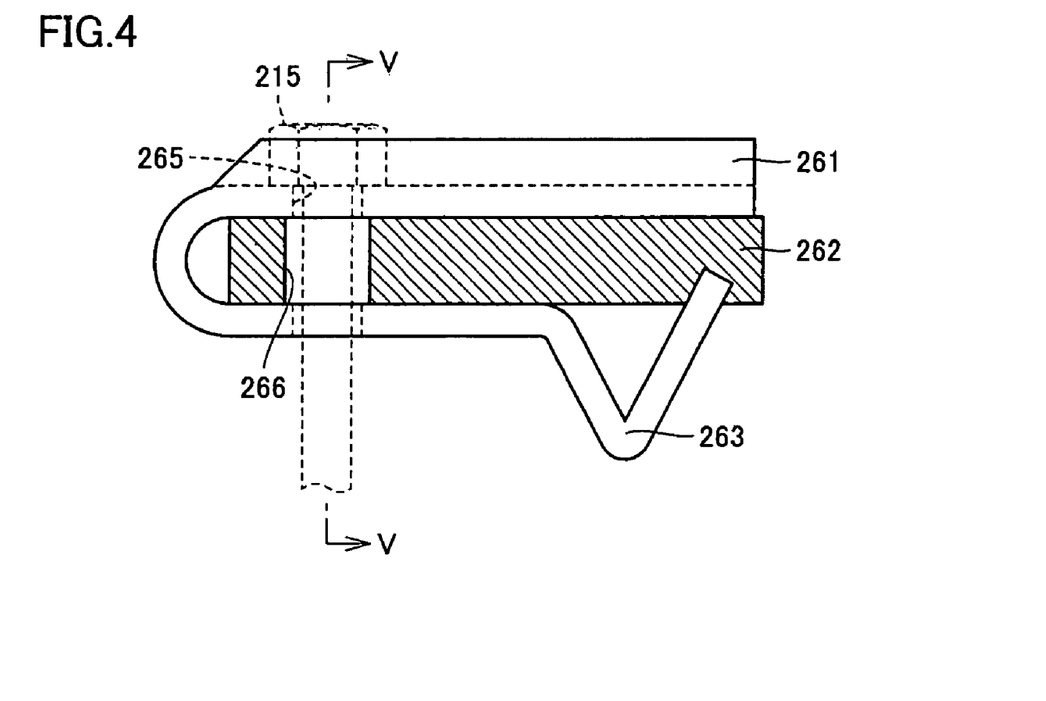
FIG. 4 is an enlarged front view of a metal fastener in FIG. 3.
Figure 5:
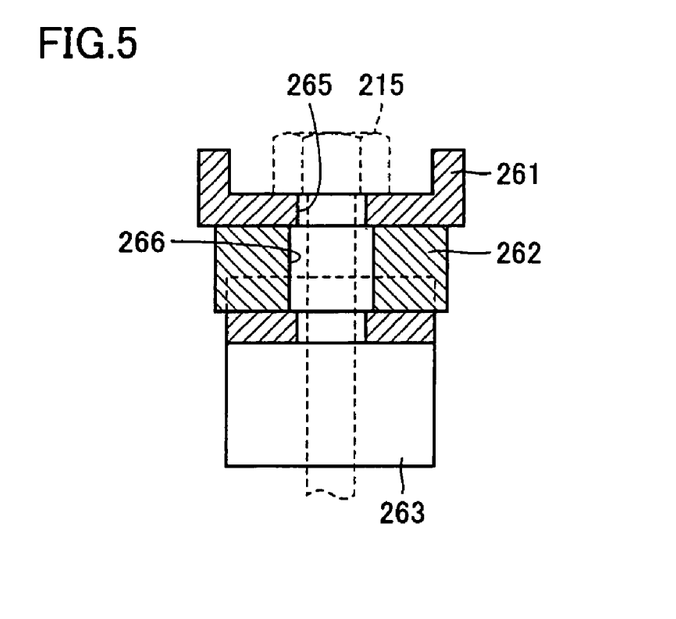
FIG. 5 is a cross-sectional view taken along line V-V in FIG. 4.

FIG. 4 is an enlarged front view of the fastener in FIG. 3. FIG. 5 is a cross-sectional view taken along line V-V in FIG. 4. Referring to FIGS. 4 and 5, fastener 261 has a curved shape and a leading end thereof is bent to be "V-shaped" to form leading end 263. An upper side of fastener 261 is U-shaped to receive bolt 215. In hardened member 262 and fastener 261, there are provided through holes 266, 265 through which bolt 215 passes. Hardened member 262 is hardened after plastic deform and can contact leading end 263.

A single or a plurality of fasteners 261 may be provided and preferably, at least three fasteners 261 are provided. Leading end 263 of fastener 261 enters between transaxle case 20 and stator core 210 and stator 230 is centered without eccentricity with respect to rotor shaft 250. When bolt 215 is further tightened, a rear end part of leading end 263 engages hardened member 262 to be plastically deformed and then work-hardened so that the wedge part (leading end 263) cannot be deformed and stator 230 is centered and fixed without eccentricity with respect to rotor shaft 250.

In the second embodiment, fastener 261 is provided as a pressing member that brings outer periphery surface 213 into contact with inner surface 21 of transaxle case 20 by pressing stator core 210 in the radial direction. Fastener 261 is fixed to stator core 210 by bolt 215.

With a thus-configured driving device according to the second embodiment, backlash is eliminated and occurrence of vibration can be further reduced by pressing stator core 210 against transaxle case 20.

Third Embodiment

Figure 6:
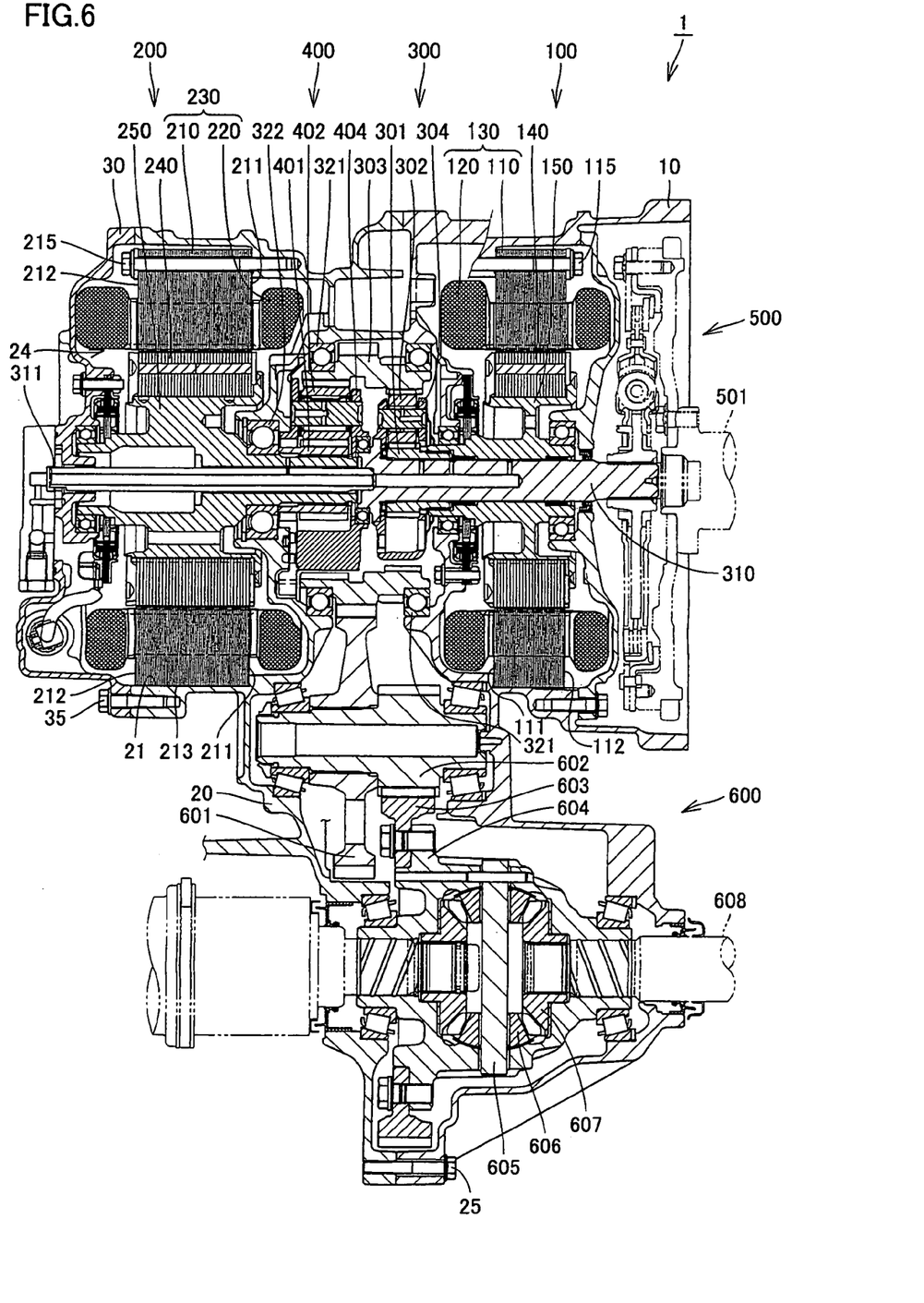
FIG. 6 is a cross sectional view of a transaxle according to a third embodiment of the present invention.

FIG. 6 is a cross-sectional view of a transaxle according to a third embodiment of the present invention. Referring to FIG. 6, transaxle 1 according to the third embodiment of the present invention is different from transaxle 1 according to the first embodiment in that coil 220 is in contact with transaxle rear cover 30. In other words, transaxle rear cover 30 and coil 220 are brought into contact with each other to be united in order to increase the apparent mass of transaxle rear cover 30, thereby preventing resonance of transaxle rear cover 30 and reducing occurrence of the radiated sound. In order to make the contact between transaxle rear cover 30 and coil 220 more reliable, an adhesive or the like may be interposed therebetween. In addition, a material to attenuate vibration may be interposed between transaxle rear cover 30 and coil 220.

With a thus-configured transaxle according to the third embodiment, effects similar to those of the transaxle according to the first embodiment can be obtained.

Fourth Embodiment

Figure 7:
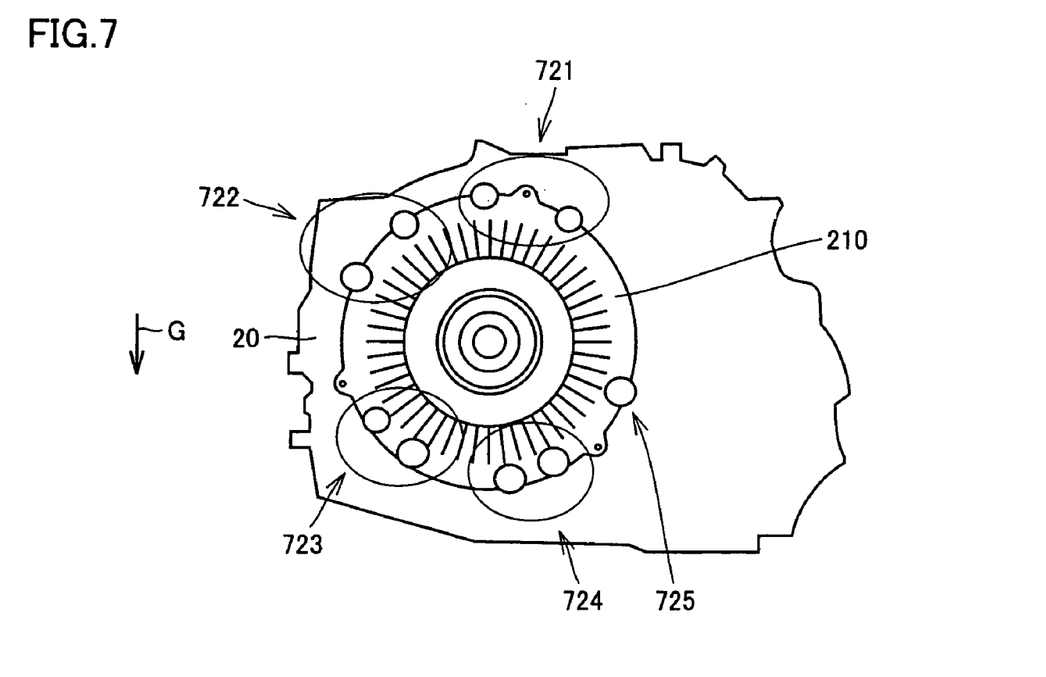
FIG. 7 is a side view of the transaxle seen in the direction shown by arrow VII in FIG. 1.

FIG. 7 is a side view of the transaxle seen in the direction shown by arrow VII in FIG. 1. In a fourth embodiment, various parts of stator core 210 are brought into contact with transaxle case 20 to find out which part should be brought into contact to reduce occurrence of noise most effectively. Arrow G in FIG. 7 shows the downward direction of the vertical direction, and stator core 210 was coupled to transaxle case 20 at one of a first region 721 of the upper part, a second region 722 of the upper left part, a third region 723 of the lower left part, a fourth region of the lower part and a fifth region 725 of the right part. As a result, it was found that occurrence of noise can be reduced most effectively when transaxle case 20 is brought into contact with stator core 210 at fourth region 724 at the lower part, because lateral vibration of the lower part of stator core 210 has an inverse phase with respect to out-of-plane vibration of the rear cover and serves to cancel lateral vibration of the rear cover when a contact is made at the part.

Embodiments of the present invention have been described, however, the embodiments shown herein can be modified in various ways. Although stator 230 is in direct contact with transaxle case 20 in the embodiments described above, a vibration controlling member such as rubber may be interposed therebetween. In addition, stator 230 may be impregnated with at least a certain amount of a bonding material such as varnish to increase bonding strength between stator core 210 and coil 220 so as to improve attenuation performance of stator 230. Bonding strength between stator core 210 and coil 220 may be increased by a material to increase bonding stiffness other than varnish.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention can be used in the field of a driving device with a rotating electric machine mounted on a vehicle, for example.

The invention claimed is:

1. A driving device with a rotating electric machine, comprising:
   a case having an opening;
   a rotating electric machine stored in said opening of said case and having a stator;
   a gear wheel stored in said case and connected to said rotating electric machine;
   a cover sealing said opening; and
   a fastener fixing said rotating electric machine to said case, wherein
   said stator has first and second thrust end faces defining an axial length thereof,
   said first thrust end face is pressed against an inner surface of said case,
   said first thrust end face is located proximal to a shaft connected to an engine and said second thrust end face is located distal to said shaft,
   said stator has a stator core and a part of an outer periphery of said stator core is in contact with the inner surface of said case, and
   said second thrust end face is spaced from said inner surface of said case, the entire second thrust end face is not in direct contact with the case, and
   the driving device further comprising:
      a pressing member bringing the outer periphery surface of said stator core into contact with the inner surface of said case by pressing said stator core in a radial direction; and
      a hardened member extending along an inner length of the pressing member, wherein said fastener extends through the pressing member, the hardened member, a hole formed in said stator core and a portion of said inner surface of said case, said fastener fixing said pressing member to said stator core.

2. The driving device with a rotating electric machine according to claim 1, wherein an end of said stator core and the inner surface of said case are in contact with each other.

3. The driving device with a rotating electric machine according to claim 2, wherein said stator and the inner surface of said case are in contact with each other at a lower side of said stator in a vertical direction.

4. A driving device with a rotating electric machine, comprising:
   a case having an opening;
   a rotating electric machine stored in said opening of said case and having a stator;
   a gear wheel stored in said case and connected to said rotating electric machine;
   a cover sealing said opening; and
   a fastener fixing said rotating electric machine to said case, wherein
   said stator has first and second thrust end faces defining an axial length thereof,
   said first thrust end face is pressed against an inner surface of said case,
   said stator has a stator core and said stator core is in contact with the inner surface of said case, and
   the driving device further comprising:
      a pressing member bringing an outer periphery surface of said stator core into contact with the inner surface of said case by pressing said stator core in a radial direction; and
      a hardened member extending along an inner length of the pressing member, wherein said fastener extends through the pressing member, the hardened member, a hole formed in said stator core and a portion of said inner surface of said case, said fastener fixing said pressing member to said stator core.

5. The driving device with a rotating electric machine according to claim 1, wherein said stator core and the inner surface of said case are in contact with each other at a side of said case in contact with said cover.

6. The driving device with a rotating electric machine according to claim 1, wherein said stator has a coil and said coil and said cover are in contact with each other.

7. The driving device with a rotating electric machine according to claim 1, comprising:
   another rotating electric machine stored in said case and separated from said rotating electric machine; and
   a planetary gear mechanism provided between the two rotating electric machines and held in said case via a bearing, wherein
   a thrust end face of said two rotating electric machines that is proximal to said planetary gear mechanism is pressed against the case.

8. The driving device with a rotating electric machine according to claim 7, wherein
   two planetary gear mechanisms are provided between said two rotating electric machines, and
   said two planetary gear mechanisms have a common ring gear.

9. A driving device with a rotating electric machine, comprising:
   a case having an opening;
   a rotating electric machine stored in said opening of said case and having a stator;
   a gear wheel stored in said case and connected to said rotating electric machine;
   a cover sealing said opening; and
   a fastener fixing said rotating electric machine to said case, wherein
   said stator has first and second thrust end faces defining an axial length thereof,
   said first thrust end face is pressed against an inner surface of said case,
   said first thrust end face is located proximal to a shaft connected to an engine and said second thrust end face is located distal to said shaft,
   said stator has a stator core and a part of an outer periphery of said stator core is in contact with the inner surface of said case, and
   the driving device further comprising:
      a pressing member bringing an outer periphery surface of said stator core into contact with the inner surface of said case by pressing said stator core in a radial direction, wherein said pressing member having a leading edge in the form of a wedge, the leading edge deforming when engaging said case and said stator core; and
      a hardened member extending along an inner length of the pressing member, the fastener extending through the pressing member, hardened member, stator core and case.

10. The driving device with a rotating electric machine according to claim 9, further including a clearance between said stator core and said case into which said leading edge is inserted.

11. The driving device with a rotating electric machine according to claim 10, wherein said leading edge presses said stator core in the radial direction.

12. The driving device with a rotating electric machine according to claim 9, wherein said leading edge being V-shaped.

* * * * *